United States Patent [19]

Takahashi et al.

[11] 4,370,262

[45] Jan. 25, 1983

[54] CATALYTIC STRUCTURE FOR TREATING EXHAUST GASES AND A PROCESS FOR MAKING THE CATALYTIC STRUCTURE

[75] Inventors: Yukio Takahashi; Yoshijiro Arikawa; Yoshio Yakushiji, all of Kure, Japan

[73] Assignee: Babcock-Hitachi, Ltd., Tokyo, Japan

[21] Appl. No.: 160,279

[22] Filed: Jun. 17, 1980

[30] Foreign Application Priority Data

Jun. 18, 1979 [JP] Japan ................................. 54-77272

[51] Int. Cl.$^3$ ........................ B01J 21/04; B01J 23/22; B01J 23/28; B01J 23/30
[52] U.S. Cl. .................................... 252/464; 252/463; 252/465; 252/466 J; 252/477 R; 423/213.2; 423/213.5
[58] Field of Search ................... 252/477 R, 465, 463, 252/464, 466 J; 422/180

[56] References Cited

U.S. PATENT DOCUMENTS

| | | | |
|---|---|---|---|
| 3,560,408 | 2/1971 | Kiehl et al. | 252/477 R |
| 4,119,701 | 10/1978 | Fedor et al. | 252/477 R |
| 4,252,690 | 2/1981 | Kamiya et al. | 252/477 R |
| 4,257,918 | 3/1981 | Ginger | 252/464 X |
| 4,285,838 | 8/1981 | Ishida et al. | 252/469 X |

FOREIGN PATENT DOCUMENTS 50-66492 6/1975 Japan ................................. 252/477 R
51-116168 10/1976 Japan .

*Primary Examiner*—W. J. Shine
*Attorney, Agent, or Firm*—Thomas E. Beall, Jr.

[57] ABSTRACT

A catalytic structure for treating exhaust gases is provided which is obtained by spraying molten aluminum onto the surface of a substrate such as wire netting, expanded metal, etc. in the presence of oxygen, to form on said surface of a substrate a roughened surface through deposit of fine aluminum particles thereon and also an aluminum oxide layer on said roughened surface, and adhering onto this layer a catalytic substance such as a catalyst for reducing nitrogen oxides.

The catalytic structure has a high catalyst-retainability to prevent the catalyst from readily peeling off from the surface even when a mechanical impact is applied thereto. Further it exhibits a superior corrosion resistance even in a corrosive environment containing sulfuric acid; hence it is suitably employed for the apparatuses for treating exhaust gases containing nitrogen oxides and sulfur oxides.

33 Claims, 8 Drawing Figures

FIG. IA
PRIOR ART
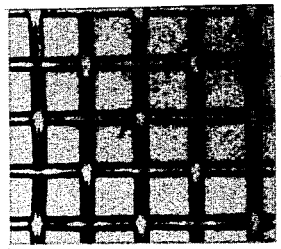
FIG. IB
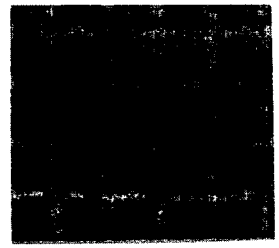
FIG. 3A
PRIOR ART  ×20
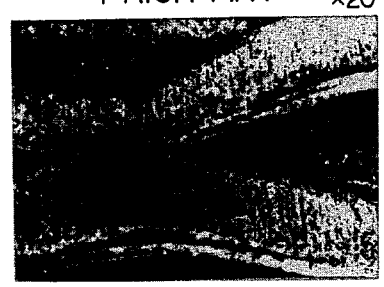
FIG. 2
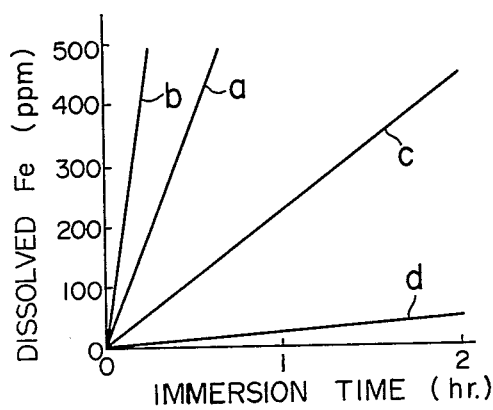
FIG. 3B
PRIOR ART  ×20
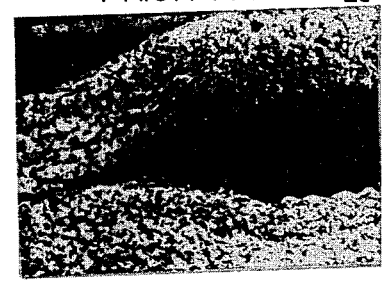
FIG. 3C  ×20
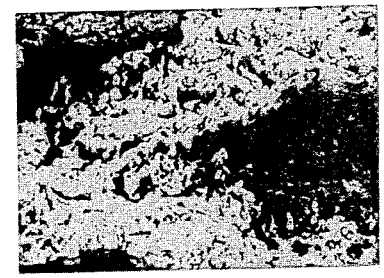

CATALYTIC STRUCTURE FOR TREATING EXHAUST GASES AND A PROCESS FOR MAKING THE CATALYTIC STRUCTURE

BACKGROUND OF THE INVENTION

1. Field of the Invention

This invention relates to a catalytic structure for treating exhaust gases. More specifically it relates to a catalytic structure having a high catalyst-retainability and also a superior acid resistance.

2. Description of the Prior Art

Heretofore, packed columns containing a granular catalyst have been employed for exhaust gas treatment such as selective reduction of nitrogen oxides contained in exhaust gases, but such a problem has been raised that fine particles entrained in the gases to be treated, adhere onto and deposit on the catalyst layer to increase the pressure loss within the system, and in the case of treating a large amount of the gases, this has a direct influence upon the running cost. As for such a problem, even in the case of exhaust gases having a relatively low content of dusts, not to mention the case of dirty gases, the properties of the deposited dusts vary with the lapse of time, resulting in increasing the adherence of dusts. In order to avoid this, an apparatus for treating exhaust gases wherein a plate-shaped catalyst is arranged in parallel to the stream of gases to be treated, have come to be employed.

Catalytic structures employed in such an apparatus can be classified into two types i.e. a structure wherein a catalyst itself is shaped into a plate and a structure wherein a material other than catalyst is employed as a substrate on which a catalyst is supported. In the case of the former plate-shaped catalyst, a catalyst component of a relatively high cost is required in a large amount, whereas in the case of the latter, this drawback is overcome, resulting in a practical advantage. In the case of the latter, metallic materials having a superior workability are often chosen for the substrate. For example, a plain weave, square mesh, metal net disclosed in Japanese patent application laid-open No. 116,168/1976 and similar network substrates are mentioned.

Preferable conditions for the catalytic structure having a catalyst supported on a substrate are a high catalyst-retainability and resistance to corrosive environment brought about by exhaust gases.

As for the means for enhancing the catalyst-retainability, a method of providing projections on a metallic plate, a method of boring holes in various kinds of forms in a metallic plate, and the like methods may be devised, but in such cases where a catalytic substance is adhered onto these substrates, there is a drawback that the catalytic substance is liable to peel off through contact or vibration.

On the other hand, the corrosive environment is brought about mainly by sulfur trioxide ($SO_3$) contained in exhaust gases, and the substrate for catalyst must endure such a corrosive environment, particularly a severe condition as in the case of corrosion in the vicinity of dew point of water vapor containing sulfuric acid. Such a corrosive environment cannot be avoided when gases to be treated are started or stopped to be passed. Further, iron compound such as $Fe_2O_3$ formed by corrosion of the substrate for catalyst, etc. has a catalytic acitivity of oxidizing $SO_2$ contained in exhaust gases into sulfur trioxide ($SO_3$). Thus, the substrate for catalyst must have a sufficient corrosion resistance. Accordingly, a catalytic structure satisfying both the catalyst-retainability and the acid resistance at the same time has been desired.

SUMMARY OF THE INVENTION

The object of the present invention is to provide a catalytic structure having overcome the above-mentioned drawbacks and having both a high catalyst-retainability and a superior corrosion resistance.

The present invention resides in;

a catalytic structure for treating exhaust gases, composed of a substrate, a roughened surface consisting of fine particles of aluminum deposited on the surface of said substrate, an aluminum oxide layer formed on said roughened surface, and a catalytic substance adhered onto said aluminum oxide layer, said catalytic structure being formed by spraying molten aluminum onto the surface of the substrate in the presence of oxygen and adhering a catalytic substance onto the resulting surface.

BRIEF DESCRIPTION OF THE DRAWINGS

FIGS. 1A and 1B show a microscopic photograph of the surface of a wire netting of a stainless steel of ASTM type 430 as a metal substrate, and that of the surface of a material obtained by spraying molten aluminum onto the above-mentioned wire netting, respectively.

FIG. 2 shows a graph depicting the results of an acid-resistant test of catalytic substrates shown later in Table 1, prior to adhesion of catalyst.

FIGS. 3A, 3B and 3C show a microscopic photograph of the surface of an expanded metal as a metal substrate, that of the surface of a material obtained by spraying molten stainless steel onto the above-mentioned expanded metal, and that of the surface of a material obtained by spraying molten aluminum onto the above-mentioned expanded metal, respectively.

DESCRIPTION OF THE PREFERRED EMBODIMENTS

Figure 4:
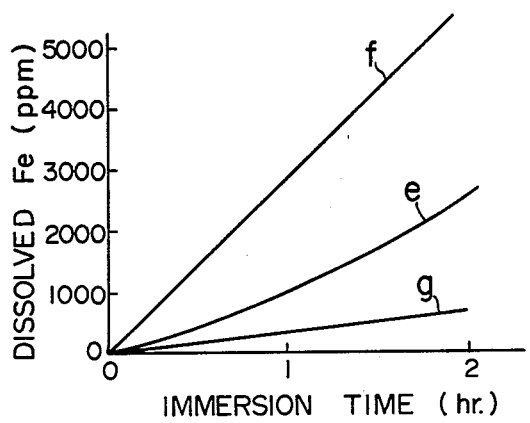
FIGS. 4 and 5 show a graph depicting the results of an acid-resistant test of a material obtained by spraying molten stainless steel or aluminum onto an expanded metal of a stainless steel having a certain composition, as a metal substrate, and a graph depicting the results of an acid-resistant test of a material which is similar to the above-mentioned, except that a stainless steel having a different composition from the above-mentioned is employed, respectively.

The catalytic structure of the present invention is a product obtained by spraying molten aluminum onto the surface of a substrate on which a catalyst is to be supported, to form a roughened surface thereon and at the same time form an aluminum oxide layer on the surface of the sprayed aluminum to thereby improve a catalyst-retainability and a corrosion resistance.

As for the substrate employed in the present invention, those which have a necessary rigidity; are superior in the adherence to molten aluminum; are not deformed by heat at the time of spraying molten aluminum; and have a heat resistance as well as a corrosion resistance enough to endure their use in a high temperature gas atmosphere, are preferable. Any other materials than metals may be used as the substrate, if the above properties are satisfied. As for the shape of the substrate, wire nettings or gauzes, expanded metals, perforated plates, plates having projections, etc. are illustrated. Further, as for the material of the metal substrate, corrosion-resistant chrome steels of type 410 or 430 of ASTM 176-74a, and corrosion-resistant chrome-nickel steels of type 304 or 316 of ASTM A167-74 are illustrated. Among these stainless steels, types 316, 304 and 430 are preferable in this order from the aspect of acid resistance. The metals employed are adequately chosen depending on the acid resistance required, the amount of aluminum adhered onto the substrate, etc. In a case where wire nettings are employed as the substrate, those having such sizes as 12 to 16 meshes and a wire diameter of 0.5 to 0.7 mm are preferable.

The spraying of molten aluminum onto the above-mentioned substrates is carried out by spraying aluminum heated up to a molten state or a nearly molten state by way of combustion or electric energy, onto the surface of the substrate and typically by heat-melting aluminum wire or powder by way of contact electric resistance or arc or melting it by a high temperature flame, and spraying the resulting molten aluminum together with a gas such as compressed air, through a nozzle, in the form of fine droplets of molten metal, onto the surface of the metal substrate to thereby adhere or accumulate them onto the surface. The thus formed roughened surface has numberless rugged projections specific to spraying with molten aluminum, has a very good catalyst-retainability, and also exhibits a superior acid resistance due to the oxide layer formed at the time of spraying of molten aluminum.

Next, a catalytic substance is adhered onto the surface of the substrate roughened by the spraying of molten aluminum. As the catalytic substance, for example, in a case where exhaust gases are denitrated, a blend of two or more kinds of titanium (Ti), tungsten (W), vanadium (V), molybdenum (Mo), iron (Fe), etc. is employed, these catalytic substances may be mixed together in the form of powder of metals or their oxides in a definite composition ratio, kneaded together with a suitable binder, and applied onto the surface of the substrate in the form of paste. Alternatively the substances may be adhered onto the surface of the substrate by dipping the substrate in a slurry of the substances.

An inorganic fibrous material may be blended with the above-mentioned paste or slurry to thereby further improve the tight adhesion of the catalyst onto the substrate. As such a filler, heat-resistant and corrosion-resistant materials such as glass fibers, metal pieces, asbestos, etc. are mentioned. Further, in a case where the substrate is a wire netting, an expanded metal, a perforated plate or the like, it is preferable to adhere the catalyst onto the substrate so that the catalytic substance on the one side of the substrate can be connected with that on the other side thereof. In such a manner the catalyst layers on the both sides of the substrate are anchored through the meshes or openings of the substrate to make it possible to further enhance the tight adhesion of the catalyst. This effectiveness is further promoted by mixing a filler in the catalyst.

The substrate having a catalytic substance adhered thereonto as mentioned above is calcined at a temperature of about 300° C. to about 500° C. to produce the catalytic structure of the present invention.

There will be described below the results of comparison of the catalyst-retainability of the catalytic structure of the present invention with those of conventional plate-shaped catalysts. As samples, (a) a wire netting of a stainless steel of type 430, (b) a material obtained by spraying a molten stainless steel of the same type 430 onto the above-mentioned wire netting, (c) a material obtained by spraying aluminum melted by way of arc onto the above-mentioned wire netting, and (d) a material obtained by spraying aluminum melted by way of arc onto a wire netting of a stainless steel of type 304 were employed, and a catalytic substance was adhered onto each of these four kinds of substrates under the same conditions to prepare test pieces (100 mm×25 mm). Each of these test pieces was 10 times dropped from a height of 1 m on an iron plate to measure the reduced weight of the test piece (percentage peel-off) caused by falling off of the catalyst. The results are shown in Table 1.

TABLE 1

| Sample | Wire netting | Sprayed material | Percentage peel-off (%) | Note |
|---|---|---|---|---|
| (a) | Type 430 | None | 16.1 | Conventional product |
| (b) | Type 430 | Type 430 | 7.4 | Conventional product |
| (c) | Type 430 | Aluminum | 2.8 | Product of this invention |
| (d) | Type 304 | Aluminum | 2.8 | Product of this invention |

It is evident from the results of Table 1 that the percentages peel-off of the catalytic structures (c) and (d) according to the present invention have been notably improved in the catalyst-retainability as compared with conventional catalytic structures. In addition, as seen from the microscopic photographs of the surface conditions of samples (a) and (c) prior to adhesion of catalyst, shown in FIGS. 1A and 1B, it is evident that the sample (c) of the present invention has a great number of rugged projections specific to spraying with molten aluminum, resulting in a superior surface condition for retaining the catalyst.

Next, the respective samples shown in Table 1 were immersed in a 5% aqueous solution of sulfuric acid at 20° C., in the state thereof prior to adhesion of catalyst to observe the amount of iron dissolved out to thereby evaluate their corrosion resistances. The results are shown in FIG. 2. As seen from FIG. 2, the amount of Fe dissolved out, as an index indicating the acid resistance, of (c) and (d) as products of the present invention, are very small. In addition, the amount of Fe dissolved out, of (b) obtained by spraying molten material of type 430 is larger than that of (a) not subjected to spraying with molten metal. The reason for this is presumed to consist in that a local, selective oxidation advanced due to the high temperature atmosphere at the time of the melt-spraying whereby the characteristics of the stainless steel were lost.

As described above, aluminum which is generally not regarded as being superior as an acid-resistant material, imparted a desirable result with respect of corrosion-resistant effectiveness. This is presumed to be due to the fact that a acid-resistant aluminum oxide layer was formed on the surface of the substrate. In addition, it was confirmed by the present inventors through an analysis that aluminum oxide was formed in the catalytic structure of a wire netting as a metal substrate, in a proportion of 3% by weight based on the weight of the structure. In an aspect of formation of aluminum oxide layer, a method of melt-spraying by way of arc in the presence of oxygen can be mentioned as a most preferable example.

Next, an example wherein an expanded metal was employed as a substrate will be mentioned below.

Expanded metals are reticular, thin metal plates obtained by applying a multiplicity of slits of short length arranged in alternate and intermittent manner to a thin metal plate and then applying thereto a tensile strength in the perpendicular direction to the length of the above-mentioned slits. As samples, (e) an expanded metal consisting of a stainless steel of type 430, (f) a material obtained by spraying molten stainless steel of the same type 430 onto the above-mentioned expanded metal, and (g) a material obtained by spraying molten aluminum onto the above-mentioned expanded metal, were employed, and a catalytic substance was adhered onto the respective substrates of these three kinds under the same conditions to prepare test pieces (100 mm×250 mm), which were then subjected to the measurement of the percentage peel-off of the catalytic substance. The results are shown in Table 2.

TABLE 2

| Sample | Substrate | Sprayed material | Percentage peel-off (%) | Note |
|---|---|---|---|---|
| (e) | Type 430 | None | 40 | Conventional product |
| (f) | Type 430 | Type 430 | 11.0 | Conventional product |
| (g) | Type 430 | Aluminum | 2.7 | Product of this invention |

An apparent from Table 2, the percentage peel-off of the catalytic structure (g) according to the present invention was reduced down to about ¼ of that of a conventional plate-shaped catalyst, and its catalyst-retainability was remarkably improved. In addition, the microscopic photographs of the surface conditions of the respective samples (e), (f) and (g) prior to adhesion of catalyst are shown in FIGS. 3A, 3B and 3C, and as seen from these photographs, it is evident that the sample (g) of the present invention has a great number of rugged projections specific to spraying with molten aluminum whereby the catalyst-retainability becomes superior.

The respective samples shown in Table 2 were immersed in a 5% aqueous solution of sulfuric acid at 20° C., in the state thereof prior to adhesion of catalyst to observe the amount of iron dissolved out to thereby evaluate their corrosion resistances. The results are shown in FIG. 4. As seen from FIG. 4, the amount of Fe dissolved out, as an index indicating the acid resistance, is smallest with the sample (g) obtained by spraying molten aluminum, while the dissolved Fe of the sample (F) obtained by spraying molten material of type 430 is larger than that of the sample (e) not subjected to spraying molten metal. The reason that aluminum which is generally not regarded as being superior as an acid-resistant material exhibited a desirable result with respect of corrosion-resistant effectiveness, is presumed to consist in that an aluminum oxide layer was formed on the surface of the substrate.

Figure 5:
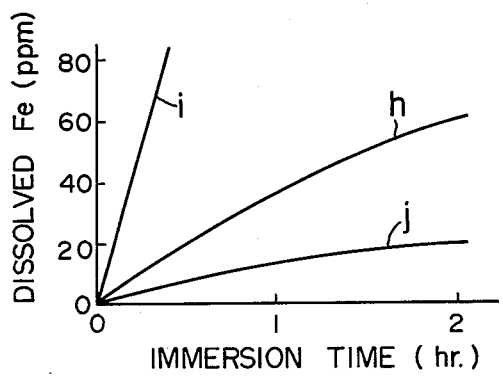

FIG. 5 shows the results of a corrosion-resistant test carried out as in the case of FIG. 4, employing an expanded metal of a stainless steel of type 304 as a substrate. In this figure, (h) shows the case of an expanded metal of a stainless steel of type 304, not subjected to spraying with molten metal; (i) shows the case of the expanded metal of (h) subjected to spraying with molten material of type 316 having a superior acid resistance to that of type 304; and (j) shows the case of the expanded metal of (h) subjected to spraying with aluminum. From the results of FIG. 5, it is evident that the amount of Fe dissolved out is smallest with the sample (j) obtained by spraying molten aluminum. In addition, it was confirmed that the amount of Fe dissolved out, of (i) obtained by spraying molten metal of type 316 having a superior acid resistance is contrarily larger than that of (h) of a material of type 304, not subjected to spraying with molten metal.

As apparent from the above-mentioned examples, it is possible to satisfy both the requirements of catalyst-retainability and acid resistance by spraying molten aluminum onto the surface of a metal substrate; hence it is possible to obtain a catalytic structure having a stable quality allowing the catalyst adhered thereonto not to readily peel off when a mechanical impact is applied thereto. Thus, it is also possible to prolong the catalyst life and further it is possible to apply the structure to reaction apparatuses under severe reaction conditions.

On the other hand, in the aspect of operation, in a case where molten stainless steel containing chromium is sprayed, an equipment for treating nuisance components such as chromium, etc. contained in sprayed molten particles, or the like equipment is required, whereas, in the case where molten aluminum is sprayed, such a problem is not raised to make operation and safety control easier.

If the catalytic structure according to the present invention is applied to reducing catalysts for nitrogen oxides, then, in addition to the above-mentioned improvement in the catalyst-retainability and corrosion resistance, the following important effectiveness is brought about:

It is possible to prevent an iron compound originated from iron contained in the metal substrate, from mixing in the catalyst; hence it is possible to inhibit oxidation of $SO_2$ contained in gases to be treated, to $SO_3$ through the catalytic action of the iron compound to thereby reduce formation of sulfuric acid which is a corrosive component in the gases. According to the experiments, when an exhaust gas having a composition of 500 ppm of $SO_2$, 3% of $O_2$ and a balance of $N_2$ was contacted with a catalytic structure of the present invention, obtained by spraying molten aluminum, the resulting percentage oxidation of $SO_2$ was 1.2%, whereas that of a catalytic structure not subjected to spraying with molten aluminum was 6.1%. Thus, the formation of $SO_3$ from $SO_2$ was inhibited by employing the catalytic structure of the present invention. Further, it is possible to prevent clogging of apparatuses, increase in pressure loss, etc. caused by formation of ammonium hydrogen sulfate.

As mentioned above, according to the present invention, a catalytic structure provided with both a high catalyst-retainability and a superior corrosion resistance can be obtained, and an excellent effectiveness such as durability of catalyst, improvement in the operability at the time of its production, and extension of its application range, etc. can be attained.

What is claimed is:

1. A catalytic structure for treating exhaust gases, composed of a substrate, a roughened surface made of fine particles of aluminum deposited on the surface of said substrate, an aluminum oxide layer formed on said roughened surface, and a catalytic substance adhered onto said aluminum oxide layer, said catalytic structure being formed by spraying molten aluminum onto the surface of a substrate in the presence of oxygen, adhering a catalytic substance onto the resulting surface, and calcining at 300°–500° C.

2. A catalytic structure according to claim 1 wherein said substrate is a wire netting of metal.

3. A catalytic structure according to claim 1 wherein said substrate is an expanded metal.

4. A catalytic structure according to any one of claim 1, claim 2 and claim 3 wherein said substrate is of a stainless steel.

5. A catalytic structure according to any one of claim 1, claim 2 and claim 3 wherein said catalytic substance is a catalyst for denitrating nitrogen oxides by reduction.

6. A catalytic structure according to claim 4, wherein said catalytic substance is a catalyst for reducing nitrogen oxides.

7. A process for manufacturing a catalytic structure for treating exhaust gases, comprising:
providing a substrate;
spraying molten aluminum onto the surface of the substrate in the presence of oxygen to simultaneously provide a roughened surface of aluminum particles on the substrate and an aluminum oxide layer formed on the roughened surface;
adhering a catalytic substance onto said aluminum oxide layer; and calcining at 300°–500° C.

8. The process according to claim 7, wherein said step of providing provides said substrate as a metal wire netting.

9. The process of claim 7, wherein said step of providing provides said substrate as an expanded metal.

10. The process of any one of claims 7–9, wherein said step of providing provides said substrate composed of stainless steel.

11. The process of any one of claims 7–9, wherein said step of adhering adheres a catalytic substance for reducing nitrogen oxides.

12. The process of claim 10, wherein said step of adhering adheres a catalytic substance for reducing nitrogen oxides.

13. A catalytic structure according to claim 1, wherein the catalytic substance comprises at least two of titanium (Ti), tungsten (W), vanadium (V), molybdenum (Mo), and iron (Fe).

14. A catalytic structure according to claim 1, wherein the catalytic substance is blended with an inorganic fibrous material.

15. A catalytic structure according to claim 14, wherein the inorganic fibrous material comprises one of glass fibers, metal pieces and asbestos.

16. The process of claim 7, wherein said step of adhering adheres a catalytic substance which comprises at least two of titanium (Ti), tungsten (W), vanadium (V), molybdenum (Mo), and iron (Fe).

17. The process of claim 7, wherein said step of adhering adheres a catalytic substance which is blended with an inorganic fibrous material.

18. The process of claim 17, wherein the inorganic fibrous material comprises one of glass fibers, metal pieces, and asbestos.

19. A catalytic structure for treating exhaust gases, manufactured according to the process comprising:
providing a substrate;
spraying molten aluminum onto the surface of the substrate in the presence of oxygen to simultaneously provide a roughened surface of aluminum particles on the substrate and an aluminum oxide layer formed on the roughened surface;
adhering a catalytic substance onto said aluminum oxide layer; and calcining at 300°–500° C.

20. The catalytic structure for treating exhaust gases, manufactured according to the process of claim 19, wherein said step of providing provides said substrate as a metal wire netting.

21. The catalytic structure for treating exhaust gases, manufactured according to the process of claim 19, wherein said step of providing provides said substrate as an expanded metal.

22. The catalytic structure for treating exhaust gases, manufactured according to the process of any one of claims 19–21, wherein said step of providing provides said substrate composed of stainless steel.

23. A catalytic structure for treating exhaust gases, manufactured according to the process of any one of claims 19–21, wherein said step of adhering adheres a catalytic substance for reducing nitrogen oxides.

24. The catalytic structure for treating exhaust gases, manufactured according to the process of claim 22, wherein said step of adhering adheres a catalytic substance for reducing nitrogen oxides.

25. The catalytic structure for treating exhaust gases, manufactured according to the process of claim 19, wherein said step of adhering adheres a catalytic substance which comprises at least two of titanium (Ti), tungsten (W), vanadium (V), molybdenum (Mo), and iron (Fe).

26. A catalytic structure for treating exhaust gases, manufactured according to the process of claim 19, wherein, said step of adhering adheres a catalytic substance which is blended with an inorganic fibrous material.

27. The catalytic structure for treating exhaust gases, manufactured according to the process of claim 26, wherein the inorganic fibrous material comprises one of glass fibers, metal pieces, and asbestos.

28. The catalytic structure of claim 1, wherein the catalytic substance is kneaded together with a binder to form a paste which is applied to said aluminum oxide layer.

29. The catalytic structure of claim 1, wherein said resulting surface is dipped into slurry of catalytic substance to adhere the catalytic substance.

30. The process of claim 7, wherein the catalytic substance is kneaded together with a binder to form a paste which is applied to said aluminum oxide layer.

31. The process of claim 7, including dipping said resulting surface into a slurry of the catalytic substance to adhere the catalytic substance.

32. The product made by the process of claim 19, wherein the catalytic substance is kneaded together with a binder to form a paste which is applied to said aluminum oxide layer.

33. The product made by the process of claim 19, including dipping said resulting surface into a slurry of the catalytic substance to adhere the catalytic substance.

* * * * *